April 30, 1935.                I. ZEISSL                1,999,312
                            WEIGHING SCALE
                           Filed Jan. 4, 1932
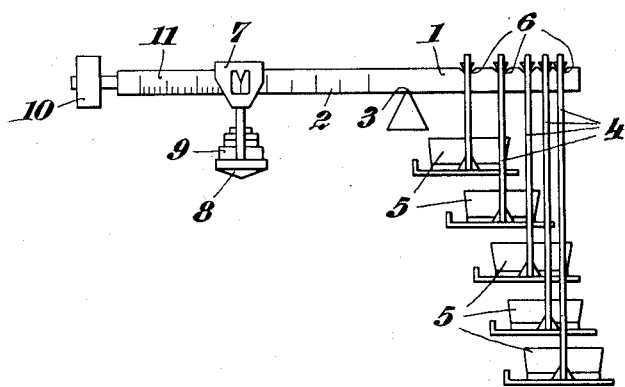
Inventor
I. Zeissl
By: Marks & Clerk
         Attys.

Patented Apr. 30, 1935

UNITED STATES PATENT OFFICE 1,999,312

WEIGHING SCALE

Ignaz Zeissl, Vienna, Austria, assignor to Stern-Gesellschaft fur Moderne Grundbautechnik m. b. H., Vienna, Austria, a company of Austria Application January 4, 1932, Serial No. 584,746
In Austria January 13, 1931

1 Claim. (Cl. 265—30)

The invention relates to a weighing scale for determining by purely mechanical means the fineness modulus of loose aggregates. The fineness modulus is a theoretical quantity to indicate the way in which the individual grain sizes within a given aggregate are sub-divided. A knowledge of this is of importance from a technical and industrial point of view if broken up or ground materials such as coal, stones and ores, as well as agricultural products such as flour, grits, groats and so forth are to be treated, and it is for example, of great value in the determination of the correct mixture proportions for concrete.

Hitherto the fineness modulus of loose aggregates has been obtained by weighing according to the known method of Duff A. Abrams. In this case a set of sieves is utilized, the mesh sizes of which are graded in a geometrical series, which relation between the mesh sizes is expressed by the formula $$d = d_0 . b^m,$$

in which $d$ is the mesh size of any sieve of the set, $d_0$ is the size of mesh of the finest sieve and $b^m$ the factor of the geometrical series, in which the exponents $m$ form a series while $b$ is taken as unity. By means of such a set of sieves a test quantity of aggregate chosen at random is divided up into part quantities of approximately similar grain size, the parts thus obtained being weighed separately. Then a series of calculations has to be carried out in order to determine the fineness modulus. This is obtained by the formula:

$$M . \Sigma g = \sum_{x=0}^{x=n} (m_x . g_x)$$

where M is the required number which according to the proposal of Abrams is designated the fineness modulus, $g$ is the weight of any of the sifted part quantities, $x$ is the number of each sieve in continuous row of sieves begining with the number 0 and ending with $n$. $g_x$ is the weight of the individual sifted part quantities and $m_x$ is the fineness modulus of these individual separate parts.

Since the index $m$ of the series factor $b^m$ can at the same time be considered as the fineness modulus of those grain sizes whose diameter corresponds exactly to the mesh size of the sieve in question, then the average value $$\frac{m + (m-1)}{2}$$

represents approximately the fineness modulus of that group of grains which has passed through the sieve of mesh size $d = d_0 . b^m$ and has remained on the sieve of the mesh size $d = d_0 . b^{m-1}$.

It is therefore necessary by this method of determination first to carry out as many individual weighing operations as there are sifting operations, then to multiply the weights so received by the fineness modulus of the corresponding grain groups, take the sum of these products and then to divide this by the weight of the whole test quantity which is used. The result is then the required fineness modulus of the aggregate in question.

Obviously this method of determination by calculation is too inconvenient and tedious for continual use on building sites where concrete has to be made and contains also the danger of errors of calculation.

In the case of the present invention the weighing of the individual sifted quantities and also each calculation is rendered superfluous and the fineness modulus is determined by a purely mechanical operation with a subsequent simple reading on a scale. The formula referred to above, because of its structure, presents this possibility. If one considers the expression $\Sigma(m_x . g_x)$ as the sum of several turning moments where the fineness factors $m_x$ belonging to the individual weights $g_x$ of the sifted part quantities of the aggregate are considered as the arms of the turning moments, and these turning moment arms are made proportional to the various factors $m_x$ in a definite but freely chosen scale, then it is also possible, since the weight of the total test quantity $\Sigma g$ can be obtained immediately, to obtain easily the length of that turning moment arm M in which the turning moment $M . \Sigma g$ balances the sum of all turning moments $\Sigma(m_x . g_x)$. This can be accomplished by means of a weighing device in which the weights $g_x$ of the individual sifted part quantities are all allowed to act together on an arm, of a balance, each at its distance $m_x$ from the fulcrum of the balance, whilst a moving weight equal to the total weight of the test quantity $\Sigma g$ is adjusted along the other arm of the balance until the two opposing turning moments balance one another. The length of the lever arm thus obtained, measured to the same scale as that on which the values of $m_x$ were read on the other side of the balance, gives immediately the value of M, that is, the desired fineness modulus of the aggregate under test.

In order to carry out the process according to the invention, first one of the usual sets of sieves is required, that is, of the specified type in which the mesh sizes of the successive sieves form a geometrical series and the mesh size $d$ of each sieve of the set corresponds to the condition $d = d_0 . b^m$ previously mentioned. The test quantity of the aggregate to be examined which has been chosen at random, and has been weighed, is separated out into part quantities on this set of sieves, and the average grain diameter lies between the mesh size of that sieve through which the sifted material has passed and of that sieve on which it has remained, and this therefore can be approximated by taking the average of these two mesh sizes. These part quantities thus obtained are placed in separate scale pans and suspended on one side of a balance, each scale pan being at a distance from the fulcrum of the balance which on a definite suitably chosen scale is proportional to the average value $$\frac{m+(m-1)}{2}$$

of the indices $m$ and $(m-1)$ which belong to the series factors $b^m$ and $b^{(m-1)}$ of the mesh sizes of the corresponding sieves. Each scale pan will thus be suspended at a different position on the balance arm.

A weight is now hung on a runner on the other arm of the balance and is of such a value that, together with the weight of the runner and its hangers, it is equivalent to the total weight of the test quantity, previously obtained. This distance, measured to the same scale by which previously the suspension points of the part quantities were determined on the other side of the balance gives the quantity which is actually the desired fineness modulus.

This method of determining the fineness modulus is carried out by a special balance with the use of one of the usual sets of sieves.

A side view of a balance of this kind is shown diagrammatically in the drawing.

The balance arm 1, 2 of the balance is supported so that it can swing on the fulcrum 3. The suspension points 6 of the rods 4 of the scale-pans 5 are at various distances from the fulcrum 3 of the balance arm. As previously mentioned, the distances from the fulcrum at which the individual sieve residues act on the balance arm are made proportional to the fineness modulus of these individual sieve residues which, as a result of sifting grain groups above and below, form grain groups accurately limited by the mesh sizes of the neighbouring sieves and whose fineness modulus are therefore the average value of the fineness modulus of those grain groups which correspond exactly to the mesh sizes of the sieves.

Since it is assumed that the mesh sizes of the set of sieves form a geometrical series, the following terms come into consideration:

$d_0 \cdot b^0, d_0 \cdot b^1, d_0 \cdot b^2, d_0 \cdot b^3, d_0 \cdot b^4 \ldots d_0 \cdot b^m \ldots d_0 \cdot b^n$ so that the fineness modulus of the grain groups, corresponding to the mesh sizes, correspond to the simple series:

$0, 1, 2, 3, 4 \ldots m \ldots n$ and the averages of the fineness modulus of the residues or grain groups from pairs of adjacent sieves amount to $\frac{1}{2}, 1\frac{1}{2}, 2\frac{1}{2}, 3\frac{1}{2}, 4\frac{1}{2} \ldots \frac{(m-1)+m}{2} \ldots \frac{(n-1)+n}{2}$ Consequently the distances of the suspension points 6 measured from the fulcrum 3 of the balance arm are made proportional to these values and the scale-pans are suspended by the suspension rods 4 at these points.

An adjustable runner 7 is located on the other balance arm 2 and a movable weight 9 is placed on the carrier 8. A balance weight 10, which can be adjusted, is fitted to the outer end of the balance arm 2 so that the scales may be balanced when empty. There is also a scale 11 on balance arm 2 the zero point of which coincides with the fulcrum 3 of the balance arm. This scale is exactly the same as that used for determining the suspension points 6 on the balance arm 1.

When using this balance for determining the fineness modulus of loose aggregates it is no longer necessary to weigh separately the part quantities obtained by sifting in the usual set of sieves. On the contrary they are merely deposited in their proper scale-pans, that is, the finest residue in the pan nearest to the fulcrum 3 of the scales and so on. The hanger 8 of the runner 7 on the balance arm 2 is then loaded until it equals the total weight of the test quantity of the aggregate. If now the runner is adjusted until the position of balance is obtained, then the fineness modulus of the aggregate under test can be read direct on the scale 11 on the balance arm 2.

Since the method described is much more simple, more convenient and consequently more rapidly carried out than the earlier known calculation or graphic methods, it is possible to exercise continuous control on building sites over the ingredients delivered and to arrange for the correct mixture suitable for each occasion.

The scales, diagrammatically illustrated in the drawing, show only five hangers and scale-pans for the reception of the grain residues. It is obvious that the scales can, without further alteration, be provided with a larger number of pans. If a single balance arm is found insufficient to accommodate a larger number of pans, the arm can be forked so that two or even more parallel arms are available on which the pans can be hung. This permits of simpler handling and more convenient operation in the case of a large number of scale-pans.

Moreover, it is possible, in order to obtain more accurate readings, to arrange the scale 11 for the moving weight 7, 8, 9 on the balance arm 2 with larger divisions, e. g. twice the size of those by which the distances of the suspension points 6 are measured on the balance arm 1 from the fulcrum 3. Obviously, the total moving weight 7, 8, 9 must then be reduced in proportion, i. e. if the scale is doubled the weight must be reduced to half the total weight of the quantity of aggregate under test.

If the mesh sizes of the set of sieves used for separating the aggregate into part quantities do not form a geometrical series, such a set of sieves can nevertheless be used in conjunction with the scales described for determining the fineness modulus if the pans on the balance arm 1 are not fixed in position but can be adjusted along a suitable scale and can be clamped at the points corresponding to the various mesh sizes. It is then only necessary to obtain by calculation the indices for the sieves in question and to adjust the pans by hand along the scale on the balance arm to the values obtained.

Naturally the balance is not only suitable for finding the fineness modulus on the Abrams principle by the metric system as well, and also for determining functions of the fineness modulus.

What I claim is:—

A weighing scale for mechanically determining the fineness modulus of loose aggregates by subdividing into portions a definite quantity of the material to be tested by means of a set of sieves of different mesh sizes, comprising in combination a balance, a plurality of scale-pans corresponding in number to the number of sifting operations suspended on one side of said balance at distance from the fulcrum of the latter proportional to the average value of the indices $m$ of the factors $b^m$ of the mesh sizes $d_o.b^m$ of the sieves by means of which said portions are obtained where $m$ equals the factor of the screen size openings, a scale on the other side of said balance, and a movable weight on the balance side last mentioned equal to the weight of the quantity of material to be tested, said scale indicating the fineness modulus of the total weight of the quantity.

IGNAZ ZEISSL.